UNITED STATES PATENT OFFICE.

AXEL KREFTING, OF CHRISTIANIA, NORWAY, ASSIGNOR TO NORSK TANGSYNDIKAT, OF CHRISTIANIA, NORWAY.

PROCESS OF PRODUCING AN ADHESIVE SUBSTANCE OF A LIGHT COLOR FROM SEAWEEDS.

1,099,382. Specification of Letters Patent. Patented June 9, 1914.

No Drawing. Application filed February 21, 1914. Serial No. 820,303.

*To all whom it may concern:*

Be it known that I, AXEL KREFTING, a subject of the King of Norway, residing at Christiania, Norway, have invented certain new and useful Improvements in a Process of Producing an Adhesive Substance of a Light Color from Seaweeds; and I do hereby declare the following to be a full, clear, and exact description of the invention, such as will enable others skilled in the art to which it appertains to make and use the same.

This invention relates to the utilization of sea weeds and has for its object a process of producing from sea weeds an adhesive substance of a light color.

In the manufacture of various adhesive substances containing algous acid from sea weeds one has hitherto employed the leaves of the weeds and more especially of the *Laminaria digitata* and *saccharina*, which are easily dissolved in a warm soda solution, of which the glutinous product containing algous acid is produced.

The leaves of *Laminaria cloustoni* are for various reasons and also because of their being difficult to preserve, not much suited for the production of adhesives. The leaves of the sea weed contain however a comparatively large amount of coloring matter which has always been a great disadvantage in the finished product because the fibrous products become a more or less dark color even after the employment of considerable quantities of bleaching means. The quantity of bleaching agents to be employed are however also limited by the fact that they partially destroy the sea weeds so that the value of the product may be reduced, when there is employed too much of them. If a colorless product is to be produced the plant fibers must therefore be completely removed by suitable means, and this to a high degree will effect an increase in the manufacturing cost. The applicant has now made a great number of experiments with the object of finding a process by means of which a light colored substance containing algous acid could be produced from sea weeds without necessitating the employment of too large quantities of bleaching agents.

According to this invention the problem has been solved in the manner that instead of the leaves of the sea weeds, the stalks of *Laminaria cloustoni* and other sea weeds with thick stalks are employed as a raw material in the manufacture of the said adhesive substances. These stalks become up to 3 cm. in cross section and of a length of more than one meter. Very large quantities of these stalks are thrown up on the shores by the storms especially during the autumn and have hitherto been utilized only by burning to produce kelp or as a manure. The outer skin (epidermis) is however of a strong brown color and a great number of experiments have been made with the object of bleaching this skin or of loosening it from the inner light mass by means of chemicals. These experiments have not succeeded. By further experiments it has been found however that the skin of the stalks are comparatively easy to remove by means of various mechanical means such as grinding, cutting or slitting when the stalks are treated in a fresh (undried) condition and according to this invention the stalks are therefore first subjected to a treatment of this kind. When the dark skin has been removed in this manner the stalks are cut up into smaller pieces, whereupon a leaching with warm water is carried out. When such organic substances and inorganic salts as are soluble in water have been removed by means of this treatment the remaining undissolved sea weed mass is subjected to a bleaching process, whereupon it is treated with chemical agents so as to make the insoluble algous salts soluble in water.

I claim.

1. In the process of producing an adhesive substance of a light color from sea weeds the improvement which consists in using as a raw material the stalks of the sea weeds and removing by mechanical means the outer dark-colored skin of the stalks before their being further treated to obtain the adhesive substance.

2. The process of producing an adhesive substance from sea weeds which consists in using as an initial material the stalks of the sea weeds removing from these stalks by mechanical means such as grinding, cutting, slitting or the like the outer dark-colored skin cutting the stalks into smaller pieces, leaching them with water and thereupon subjecting them to a treatment with chemicals to effect the dissolution of the same.

In testimony that I claim the foregoing as my invention, I have signed my name in presence of two subscribing witnesses.

AXEL KREFTING.

Witnesses:
M. E. GUTTORMSEN,
RUTH LINDSTRÜN.